Patented Aug. 14, 1928.

1,680,778

UNITED STATES PATENT OFFICE.

FRIEDRICH FELIX, OF BASEL, SWITZERLAND, ASSIGNOR TO SOCIETY OF CHEMICAL INDUSTRY IN BASLE, OF BASEL, SWITZERLAND.

PRODUCT VALUABLE AS DISPERSING AGENT AND PROCESS OF MAKING SAME.

No Drawing. Application filed May 23, 1927, Serial No. 193,738, and in Switzerland May 29, 1926.

It has been found that a new product is obtained by treating the resinous residue, which is formed as by-products at the rectification of benzaldehyde, with sulfonating agents, such as sulfuric acid, sulfuric acid containing sulfuric anhydride or chlorosulfonic acid.

The new product yields easily soluble alkali and alkaline-earth salts, which, when dried, form light to dark gray powders. It is very suitable as dispersing agent for the formation of emulsions.

The following example illustrates the invention, the parts being by weight:

10 parts of the resinous residue, which is obtained as by-product at the rectification of benzaldehyde, are gradually introduced, while stirring, into 15 parts of sulfuric acid containing about 15 per cent sulfuric anhydride. The mixture is stirred at 40–50° C. until a test portion, diluted with water, is soluble almost clearly on heating. Thereupon the solution is introduced into water and treated with milk of lime. The calcium salt thus obtained is converted with carbonate of soda into the sodium salt, which is obtained by boiling down the solution. It forms a gray powder.

The new product may be liberated from dark colored accompanying substances, if any, by treating it with oxidizing agents, such as hypochlorites.

What I claim is:—

1. The herein described process for the manufacture of a new product, by treating the resinous residue, which is obtained as by-product at the rectification of benzaldehyde, with sulfonating agents.

2. The herein described process for the manufacture of a new product, by treating the resinous residue, which is obtained as by-product at the rectification of benzaldehyde, with sulfuric acid containing sulfuric anhydride.

3. As new product the product obtained by treating the resinous residue, which is formed as by-product at the rectification of benzaldehyde, with sulfonating agents, yielding easily soluble alkali and alkaline-earth salts, which form, when dried, light to dark gray powders, very suitable as dispersing agents for the formation of emulsions.

4. As new product the product obtained by treating the resinous residue, which is formed as by-product at the rectification of benzaldehyde, with sulfuric acid containing sulfuric anhydride, yielding easily soluble alkali and alkaline-earth salts, which, when dried, form light to dark gray powders, very suitable as dispersing agents for the formation of emulsions.

In witness whereof I have hereunto signed my name this 12th day of May 1927.

FRIEDRICH FELIX.